US 6,651,522 B2

(12) United States Patent
Petocchi et al.

(10) Patent No.: US 6,651,522 B2
(45) Date of Patent: Nov. 25, 2003

(54) GEAR ALIGNMENT

(75) Inventors: Ermanno C. Petocchi, Rochester, NY (US); Roger C. Male, Fairport, NY (US); Stephen A. Bonelli, Webster, NY (US); Michael J. Hill, Rochester, NY (US); Thomas C. Hatch, Williamson, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/947,018

(22) Filed: Sep. 5, 2001

(65) Prior Publication Data

US 2003/0066371 A1 Apr. 10, 2003

(51) Int. Cl.[7] .............................. F16H 55/18; H02K 5/26
(52) U.S. Cl. ...................... 74/421 A; 74/409; 403/348
(58) Field of Search ....................... 74/395, 396, 397, 74/406, 409, 413, 421 A, 421 R; 403/348, 349, 350

(56) References Cited

U.S. PATENT DOCUMENTS

| | | | | | |
|---|---|---|---|---|---|
| 3,234,808 A | * | 2/1966 | Nelson | ...................... | 74/421 A |
| 4,098,072 A | * | 7/1978 | Brouwer | ...................... | 368/62 |
| 4,147,071 A | * | 4/1979 | Scribner et al. | ............... | 74/409 |
| 4,768,545 A | * | 9/1988 | Hoffman | ................. | 137/315.37 |
| 5,167,465 A | * | 12/1992 | Inui et al. | .................... | 403/317 |
| 5,303,104 A | * | 4/1994 | Aruga et al. | .............. | 360/267.2 |
| 6,267,373 B1 | * | 7/2001 | Takata | ......................... | 271/274 |
| 6,347,559 B1 | * | 2/2002 | Lenzi et al. | ................ | 74/473.1 |
| 6,450,053 B1 | * | 9/2002 | Friedrichs et al. | ............ | 74/352 |

FOREIGN PATENT DOCUMENTS

| | | |
|---|---|---|
| DE | 31 33 635 | 1/1983 |
| GB | 2 347 480 | 9/2000 |
| JP | 06159479 A * | 6/1994 ........... F16H/55/17 |

OTHER PUBLICATIONS

Patent Abstracts of Japan, Publication No. 07222394, Aug. 18, 1995, Asahi Optical Co. Ltd., Fixing Unit for Motor.
Patent Abstracts of Japan, Publication No. 08308177, Nov. 22, 1996, Oriental Motor Co. Ltd., Motor with Speed Reducer.

* cited by examiner

Primary Examiner—Thomas R. Hannon
Assistant Examiner—Timothy McAnulty
(74) Attorney, Agent, or Firm—David E. Henn

(57) ABSTRACT

Guide ring arranged coaxially with a drive shaft includes locating and locking features ensuring proper orientation of drive and driven shafts, also ensuring proper backlash between gears mounted thereon. Guide ring is inserted through a keyed aperture of a mounting bracket and brought into proximity with the driven shaft frame. Rotation of motor and guide ring in first direction draws shafts into alignment; mounting bracket is attached to driven shaft frame. Motor and guide ring then rotated in opposite direction to second extreme position in which the motor is locked and driven shaft can rotate freely.

4 Claims, 6 Drawing Sheets

GEAR ALIGNMENT

BACKGROUND OF THE INVENTION

A consistent problem with assembling gear trains is proper alignment of the gears in the train. Typically, the assembler will have to use multiple tools to perform adjustments to the train once it is assembled. If such adjustments are not made, then improper backlash can result, causing excessive wear and premature failure of the gears involved.

Further, the conventional assembly of a motor pinion gear, within backlash tolerance, to a driven gear when the driven gear is mounted on a live shaft and electrically biased requires having either too much backlash or the need for an assembly tool. Past designs incorporated brackets, cantilevered shafts, and set-up/alignment tools to ensure proper pinion to gear mesh. As many as three tolerances are added together to determine the gear mesh backlash in prior art systems, which allows the introduction of too much error into the assembly.

SUMMARY OF THE INVENTION

To aid the assembler, embodiments include a locating or guide ring coaxial with the drive shaft on the motor frame and on the same centerline as the pinion gear. The motor/locator is captured into the motor mounting bracket but has the ability to rotate through arcs, such as arcs of, for example, about 30 degrees. This allows the motor assembly to rotate on the motor mounting bracket and, with the guide ring, capture an extension of the driven gear shaft to set the proper center distance. Rotating the motor back disengages the locator from the driven shaft, and continuing to rotate the motor locks the motor relative to the motor bracket for final assembly. As a result, the number of tolerances is reduced, the motor and bracket can be shipped in a partially assembled state and, during manufacturing, the motor and bracket can be assembled in two steps without the need for an alignment tool/feature.

DETAILED DESCRIPTION OF THE INVENTION

Figure 1:
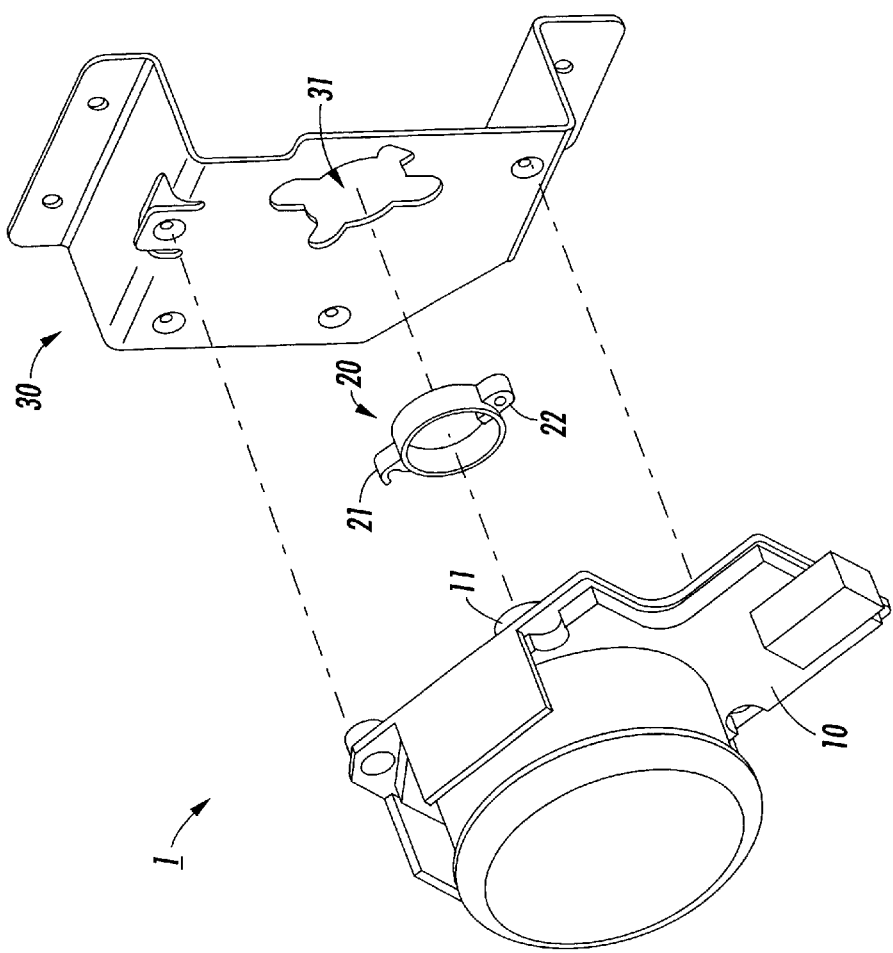
FIG. 1 is a perspective exploded view of an embodiment from behind a motor frame.

Embodiments include a locating or guide ring 20 on the motor frame 10 and on the same centerline as the drive shaft 11 of a motor. The guide ring 20 is captured into the motor mounting bracket 30 by, for example, a keyed aperture 31, but can rotate through arcs as large as about 30 degrees. This allows the motor assembly, including the motor frame 10 and drive shaft 11, to rotate on the motor mounting bracket 30 and capture an extension of a driven shaft 41 to set the proper center distance between the shafts 11, 41 and their centerlines. Rotating the motor assembly back disengages the locating feature 21 from the driven shaft 41. As a result, the motor and bracket can be shipped in a partially assembled state and, during manufacturing, the motor and bracket can be assembled in two steps without the need for an alignment tool/feature.

Figure 2:
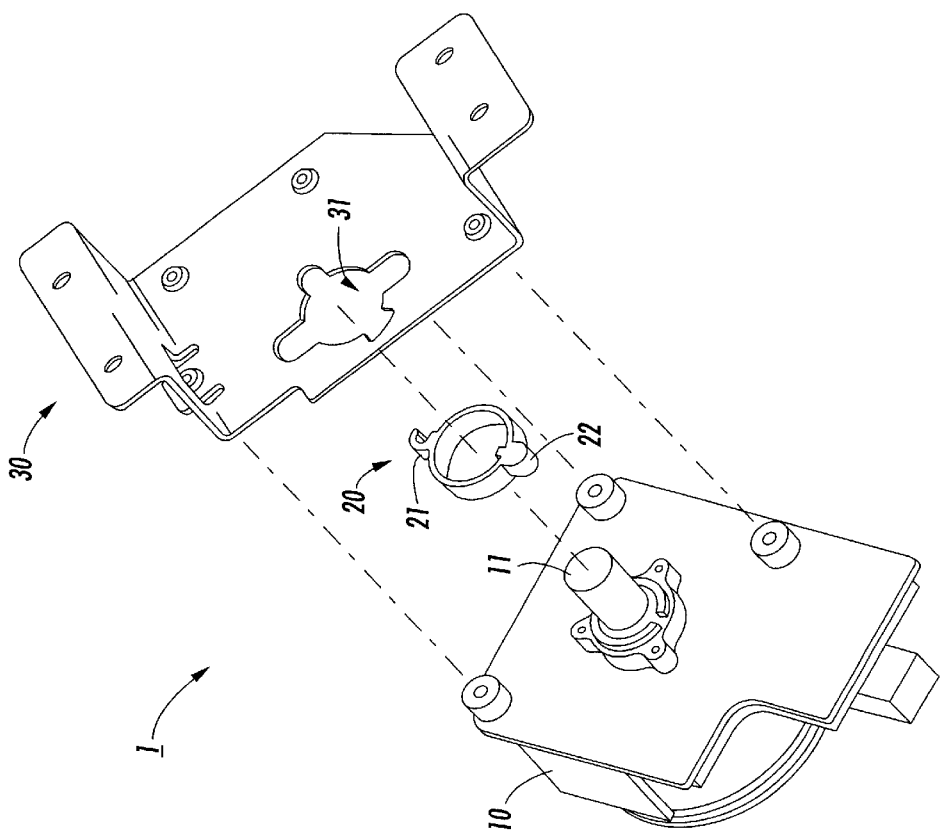
FIG. 2 is a perspective exploded view of an embodiment from behind a motor mounting bracket.

As seen in FIGS. 1 and 2, the guide ring 20 has two ears 21, 22 projecting from its outer circumferential surface. One ear 21 includes a locating feature that engages the driven gear shaft. The other ear 22 includes a detent or snap feature, such as a button, to snap the motor mounting bracket to the motor when desired. The locating feature can be, for example, a pilot diameter that can accommodate an end of the driven shaft 41 for alignment, or it can be, as an additional example, a pocket in the ear 21 that is sized to capture and align the driven shaft 41, placing it in the proper orientation for the drive and driven gears to mesh.

In embodiments, the guide ring 20 is attached to the motor frame 10, such as by a press fit. In other embodiments, the guide ring 20 is formed integrally with and as one piece with the motor frame 10, such as by casting, milling, or stamping during manufacture of the motor frame 10. There is enough space between the motor frame 10 and the ears 21, 22 of the guide ring 20 for the thickness of the mounting bracket 30.

The driven shaft includes, in embodiments, a short shaft extension concentric to the driven shaft to allow location and alignment between the bracket 30 and the driven shaft. The extension need not be very long and can be on the order of, for example, about a few millimeters. The motor assembly remains piloted by the outside diameter of the guide ring onto the mounting bracket, but the snap feature on the second ear 22 can inhabit and travel in a groove in the bracket to prevent disassembly after being snapped onto the motor.

The bracket 30 includes, in embodiments, an aperture 31 keyed for engagement and aligning the ears 21, 22 on the guide ring 20, thus allowing the user to affix the motor on the bracket 30 by rotating the motor in the pilot diameter of the bracket 30 and snapping the button into the bracket groove. The bracket 30 loosely mounts to the driven shaft frame/support so that the motor can be rotated about the driven shaft axis, bringing the locating feature in engagement with the shaft extension to ensure proper backlash in the mesh between the drive gear 12 and the driven gear 42. The bracket can then be fixed to the driven gear frame/support and the motor can be counter-rotated to disengage the locating feature, moving it away from the locating diameter of the driven gear and solidly mounting the motor on the bracket 30.

Figure 3:
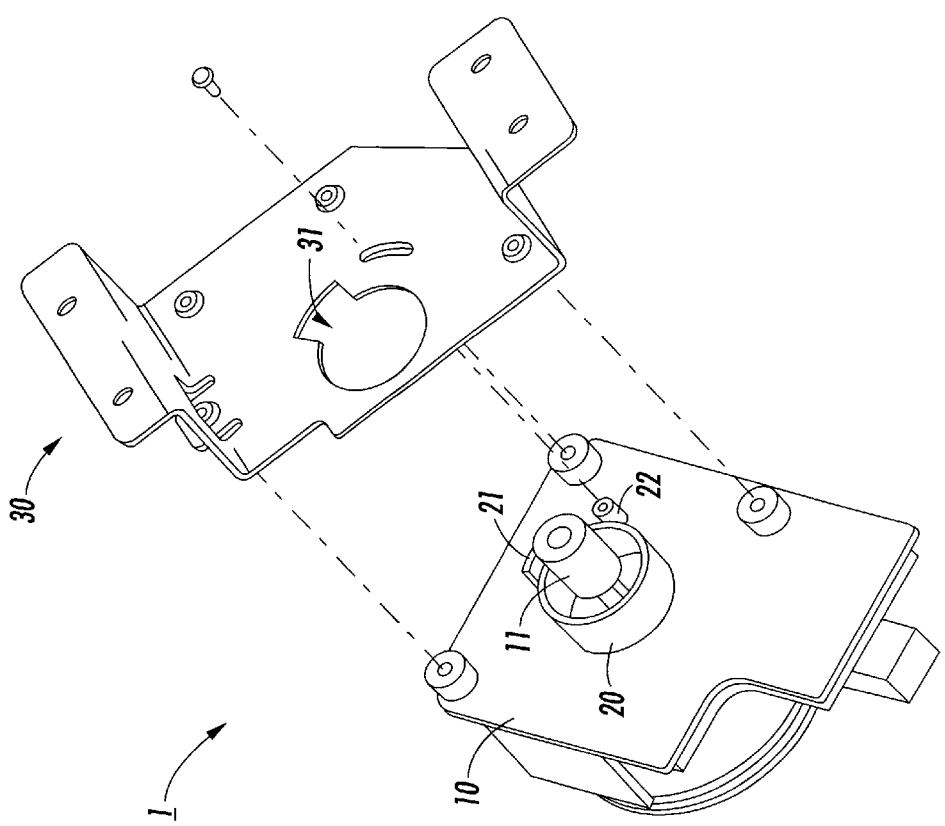
FIG. 3 is a perspective exploded view of an embodiment from behind a motor mounting bracket.
Figure 4:
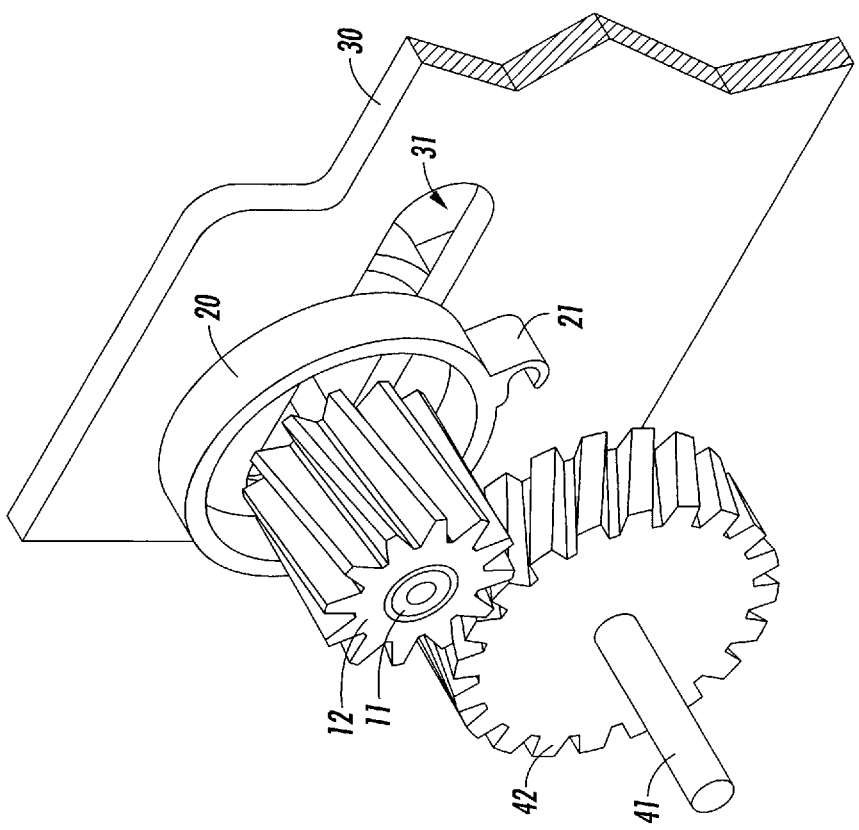
FIG. 4 is a schematic of an assembled embodiment.
Figure 5:
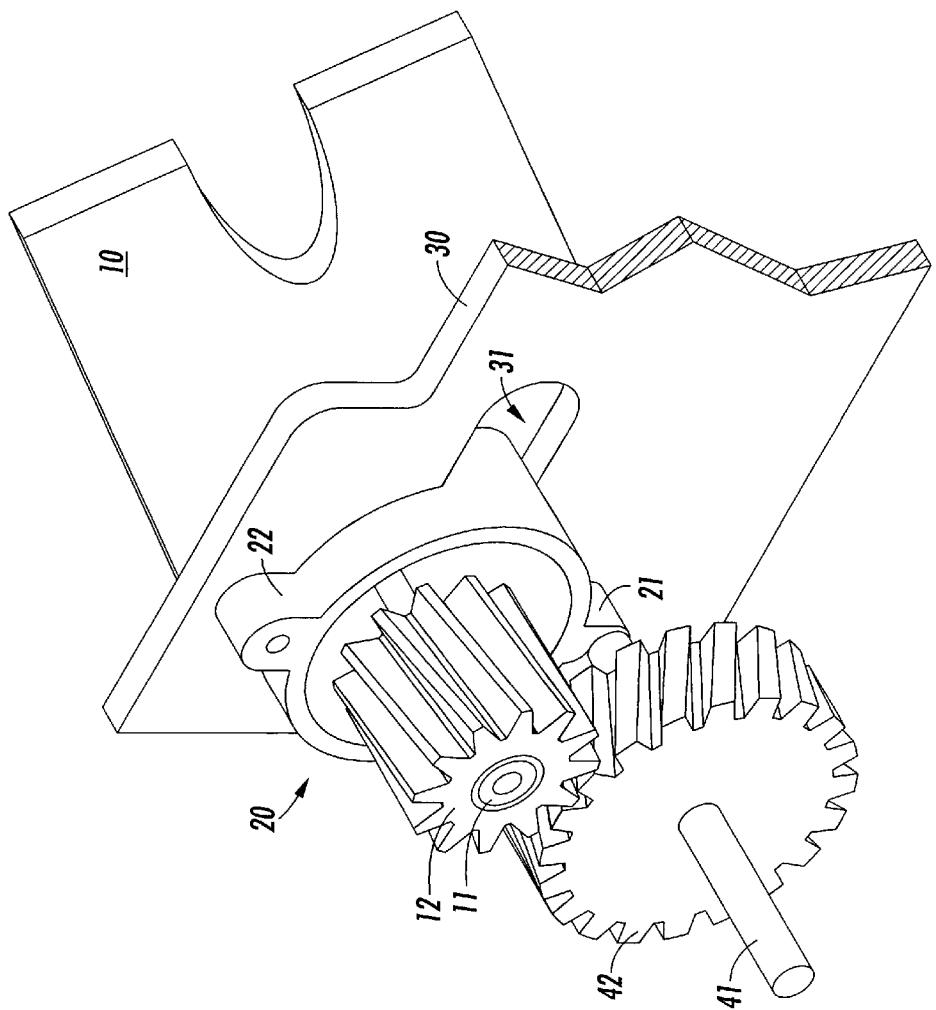
FIG. 5 is another schematic of an assembled embodiment.
Figure 6:
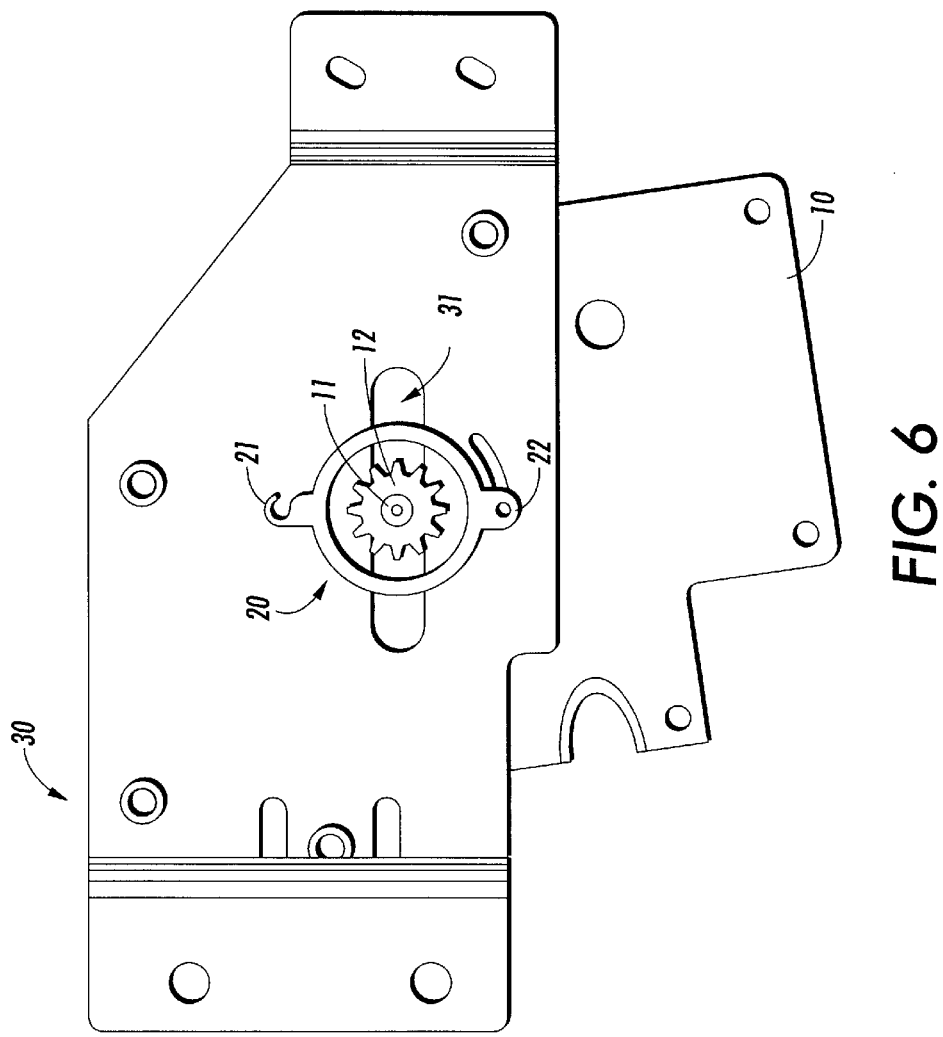
FIG. 6 is a schematic of an assembled embodiment not showing the driven shaft and gear.

Embodiments can have the locating feature and snap feature or detent as part of the motor frame as shown, for example, in FIG. 3. In such instances, the bracket 30 includes an aperture 31 through which the guide ring 20 extends. A locating slot that allows a shoulder screw to retain the motor on the bracket and also allow the motor to rotate about its output shaft to two fixed positions at the extreme ends of the slot. The assembly process would be substantially the same as for embodiments having the locating feature and snap feature or detent on the guide ring. The bracket with the motor assembly attached is loosely assembled to the driven shaft's frame. The motor assembly is then rotated about the output gear axis to a first extreme position in which the locating feature on the motor frame engages the driven shaft. This sets the proper center distance between the driver and the driven gear and proper backlash results. At this point, the bracket is fixed to the driven gear frame. The motor assembly is then rotated from this first extreme position, back through the initial position, and on to a second extreme position in which the detent or snap feature solidly attaches the motor to the bracket. The rotation also introduces clearance between the driven shaft and the locating feature.

Embodiments thus simplify a mounting technique for a developer drive motor. Since the motor pinion gear 12 drives its developer housing directly via helical gears 12, 42±, gear-to-gear backlash and/or misalignment can arise, creating undesirable vibrations in the developer housing. These vibrations could in turn cause copy quality problems by introducing banding into the copy image on the photoreceptor at the development field.

The developer drive assembly in embodiments includes a mounting bracket 30 to be attached to the machine frame. A locator ring 20, attached to the drive motor assembly 10, such as on the front bearing hub of the drive pinion gear 12, is set to a predetermined angle to locate the drive pinion gear 12 properly wit the driven gear 42, thereby ensuring that backlash is kept within a predetermined range. The locator 20 has a section 21 including an opening, such as a rounded slot, on the pinion centerline arc and made to engage a necked down shaft extension of the driven shaft 41 on which the driven gear 42 is mounted.

Prior to mounting the assembly, the developer housing is locked into position within the machine frame. To mount the developer drive motor assembly 10, one places the motor assembly 10 onto the machine back plane, and inserts screws/bolts without fully tightening to allow the assembly to float somewhat. The hole pattern in the assembly matches that in the frame so that only one alignment is possible for mounting the motor assembly. One then rolls the motor counter clock wise to engage the shaft extension of the developer housing, then tightens the mounting bracket screws/bolts. Finally, the motor is rotated clockwise to line up mounting holes in the motor with mounting holes in the mounting bracket, into which screws/bolts are inserted and tighten to capture the motor to the assembly bracket.

Other modifications of the present invention may occur to those skilled in the art subsequent to a review of the present application, and these modifications, including equivalents thereof, are intended to be included within the scope of the present invention.

What is claimed is:

1. A self-aligning motor mount comprising:

a driving gear mounted on a drive shaft selectively driven by a motor;

a guide ring coaxially arranged about the drive shaft;

an ear projecting from an outer circumference of the guide ring;

a motor mounting bracket including an aperture through which the drive shaft and the guide ring extend and that interacts wit the ear; and the ear including a locating feature that engages a driven shaft when the motor is rotated from an initial position in a first direction, thus aligning the drive and driven shafts, and disengages the driven shaft when the motor is rotated back to the initial position.

2. The mount of claim 1 wherein the driven shaft supports a driven gear that meshes with and is driven by the driving gear.

3. The mount of claim 1 wherein the guide ring is a separate part that is attached to a motor frame.

4. The mount of claim 1 wherein the guide ring is formed integrally with and as a single piece with a motor frame.

* * * * *